United States Patent
Monte et al.

(10) Patent No.: US 8,676,121 B1
(45) Date of Patent: Mar. 18, 2014

(54) METHOD AND APPARATUS FOR TRANSMITTING MESSAGE FROM SHORT-RANGE WIRELESS DEVICE OVER A SATELLITE NETWORK

(75) Inventors: Paul A. Monte, San Jose, CA (US); Alfonso Bravo, Sterling, VA (US); Johnathan Beech, San Jose, CA (US)

(73) Assignee: Globalstar, Inc., Covington, LA (US)

( * ) Notice: Subject to any disclaimer, the term of this patent is extended or adjusted under 35 U.S.C. 154(b) by 282 days.

(21) Appl. No.: 13/205,350

(22) Filed: Aug. 8, 2011

Related U.S. Application Data

(60) Provisional application No. 61/491,725, filed on May 31, 2011.

(51) Int. Cl.
*H04B 7/00* (2006.01)

(52) U.S. Cl.
USPC .................... 455/41.2; 455/552.1; 455/553.1; 455/420

(58) Field of Classification Search
USPC ............ 455/41.2, 41.3, 423, 420, 553.1, 566, 455/419, 552.1, 557, 418; 345/689, 650, 345/204, 205
See application file for complete search history.

(56) References Cited

U.S. PATENT DOCUMENTS

| | | | |
|---|---|---|---|
| 5,414,432 A | 5/1995 | Penny et al. | |
| 5,504,493 A | 4/1996 | Hirshfield | |
| 5,552,798 A | 9/1996 | Dietrich et al. | |
| 5,581,268 A | 12/1996 | Hirshfield | |
| 5,592,481 A | 1/1997 | Wiedeman et al. | |
| 5,619,525 A | 4/1997 | Wiedeman et al. | |
| 5,634,190 A | 5/1997 | Wiedeman | |
| 5,640,386 A | 6/1997 | Wiedeman | |
| 5,664,006 A | 9/1997 | Monte et al. | |
| 5,697,050 A | 12/1997 | Wiedeman | |
| 5,758,260 A | 5/1998 | Wiedeman | |
| 5,758,261 A | 5/1998 | Wiedeman | |
| 5,791,598 A | 8/1998 | Rodden et al. | |
| 5,796,760 A | 8/1998 | Wiedeman et al. | |
| 5,802,445 A | 9/1998 | Wiedeman et al. | |
| 5,812,538 A | 9/1998 | Wiedeman et al. | |
| 5,812,932 A | 9/1998 | Wiedeman et al. | |
| 5,859,874 A | 1/1999 | Wiedeman et al. | |
| 5,867,109 A | 2/1999 | Wiedeman | |
| 5,875,180 A | 2/1999 | Wiedeman et al. | |
| 5,884,142 A | 3/1999 | Wiedeman et al. | |
| 5,896,558 A | 4/1999 | Wiedeman | |
| 5,905,943 A | 5/1999 | Wiedeman et al. | |
| 5,912,641 A | 6/1999 | Dietrich | |
| 5,914,675 A | 6/1999 | Tognazzini | |
| 5,918,157 A | 6/1999 | Wiedeman et al. | |
| 5,956,619 A | 9/1999 | Gallagher et al. | |

(Continued)

OTHER PUBLICATIONS

Patent Cooperation Treaty—Written Opinion of the International Searching Authority for International Application No. PCT/US10/53689, Dec. 27, 2010, pp. 1-9, USA.

*Primary Examiner* — Dominic E Rego
(74) *Attorney, Agent, or Firm* — Jones Walker LLP

(57) ABSTRACT

A communications system including a SN Device including a satellite transmitter and a local wireless transceiver and a GUI Device, separate from the SN Device. The GUI Device includes a user interface and local wireless transceiver capable of establishing a wireless link with the SN Device. The GUI Device transmits command information to the SN Device and the SN Device transmits at least location data to a satellite network.

24 Claims, 4 Drawing Sheets

(56) References Cited

U.S. PATENT DOCUMENTS

| | | |
|---|---|---|
| 5,999,623 A | 12/1999 | Bowman et al. |
| 6,021,309 A | 2/2000 | Sherman et al. |
| 6,023,463 A | 2/2000 | Wiedeman et al. |
| 6,023,606 A | 2/2000 | Monte et al. |
| 6,064,857 A | 5/2000 | Wiedeman et al. |
| 6,067,442 A | 5/2000 | Wiedeman et al. |
| 6,072,768 A | 6/2000 | Wiedeman et al. |
| 6,081,710 A | 6/2000 | Sherman et al. |
| 6,085,067 A | 7/2000 | Gallagher et al. |
| 6,091,933 A | 7/2000 | Sherman et al. |
| 6,097,752 A | 8/2000 | Wiedeman et al. |
| 6,101,385 A | 8/2000 | Monte et al. |
| 6,125,260 A | 9/2000 | Wiedeman et al. |
| 6,128,487 A | 10/2000 | Wiedeman |
| 6,134,423 A | 10/2000 | Wiedeman et al. |
| 6,160,994 A | 12/2000 | Wiedeman |
| 6,201,961 B1 | 3/2001 | Schindall et al. |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,272,316 B1 | 8/2001 | Wiedeman et al. |
| 6,272,325 B1 | 8/2001 | Wiedeman et al. |
| 6,272,339 B1 | 8/2001 | Wiedeman |
| 6,301,476 B1 | 10/2001 | Monte et al. |
| 6,418,147 B1 | 7/2002 | Wiedeman |
| 6,463,279 B1 | 10/2002 | Sherman et al. |
| 6,567,645 B1 | 5/2003 | Wiedeman et al. |
| 6,587,687 B1 | 7/2003 | Wiedeman |
| 6,594,469 B1 | 7/2003 | Serri et al. |
| 6,628,921 B1 | 9/2003 | Vaddiparty et al. |
| 6,654,357 B1 | 11/2003 | Wiedeman |
| 6,661,996 B1 | 12/2003 | Wiedeman et al. |
| 6,735,439 B2 | 5/2004 | Bowman et al. |
| 6,735,440 B2 | 5/2004 | Wiedeman et al. |
| 6,775,251 B1 | 8/2004 | Wiedeman et al. |
| 6,775,519 B1 | 8/2004 | Wiedeman et al. |
| 6,804,514 B2 | 10/2004 | Wiedeman et al. |
| 6,985,454 B1 | 1/2006 | Wiedeman et al. |
| 7,042,338 B1 | 5/2006 | Weber |
| 7,053,822 B2 | 5/2006 | Rickerson |
| 7,142,853 B2 | 11/2006 | Wiedeman et al. |
| 7,180,873 B1 | 2/2007 | Monte et al. |
| 7,630,682 B2 | 12/2009 | Monte et al. |
| 7,672,639 B2 | 3/2010 | Vaddiparty et al. |
| 7,711,320 B2 | 5/2010 | Monte et al. |
| 7,792,487 B2 | 9/2010 | Monte et al. |
| 2002/0031102 A1 | 3/2002 | Wiedeman et al. |
| 2002/0031103 A1 | 3/2002 | Wiedeman et al. |
| 2002/0032002 A1 | 3/2002 | Wiedeman et al. |
| 2002/0032799 A1 | 3/2002 | Wiedeman et al. |
| 2002/0039900 A1 | 4/2002 | Wiedeman et al. |
| 2002/0123343 A1 | 9/2002 | Wiedeman et al. |
| 2002/0132578 A1 | 9/2002 | Wiedeman et al. |
| 2002/0132619 A1 | 9/2002 | Wiedeman et al. |
| 2002/0137511 A1 | 9/2002 | Bowman et al. |
| 2002/0142781 A1 | 10/2002 | Wiedeman et al. |
| 2004/0072583 A1 | 4/2004 | Weng |
| 2004/0147220 A1 | 7/2004 | Vaddiparty et al. |
| 2006/0229109 A1 | 10/2006 | Oesterling et al. |
| 2007/0101274 A1 | 5/2007 | Kurlander et al. |
| 2007/0155316 A1 | 7/2007 | Monte et al. |
| 2007/0155317 A1 | 7/2007 | Monte et al. |
| 2007/0155318 A1 | 7/2007 | Monte et al. |
| 2007/0155319 A1 | 7/2007 | Monte et al. |
| 2007/0247316 A1 | 10/2007 | Wildman et al. |
| 2007/0257889 A1 | 11/2007 | Croy |
| 2008/0113666 A1 | 5/2008 | Monte et al. |
| 2008/0158002 A1 | 7/2008 | Parkinson et al. |
| 2009/0121841 A1 | 5/2009 | Twitchell |
| 2009/0121930 A1 | 5/2009 | Bennett et al. |
| 2010/0240306 A1* | 9/2010 | Jendbro et al. ............... 455/41.2 |
| 2011/0140884 A1 | 6/2011 | Santiago et al. |
| 2011/0177790 A1 | 7/2011 | Monte et al. |
| 2012/0115451 A1* | 5/2012 | Roka ........................... 455/417 |

* cited by examiner

METHOD AND APPARATUS FOR TRANSMITTING MESSAGE FROM SHORT-RANGE WIRELESS DEVICE OVER A SATELLITE NETWORK

This application claims the benefit under 35 USC §119 to U.S. provisional application Ser. No. 61/491,725, filed May 31, 2011, which is incorporated by reference herein in its entirety.

FIELD OF INVENTION

The present invention relates to the transmission of data over satellite networks. One embodiment of the invention is a method to provide transmissions of simplex low data rate messages over a satellite network originated from short distance wireless capable devices.

BACKGROUND OF INVENTION

Short range wireless technologies are being introduced to the market at a rapid pace. Such technologies are being implemented in devices to access packet data networks, to monitor assets, to communicate with alarm systems, or for use in other applications. Cellular phone manufacturers have implemented these technologies to carry voice wirelessly to headsets, to stream music from MP3 players to car stereos, or even to monitor a person's health condition for display in an application running at the cell phone user interface.

Many of these manufacturers are allowing third party developers to "develop" applications to interface to accessories through these short range wireless technologies; however many applications are designed to route the information to an end user or to servers in the Internet. While these applications are being developed to satisfy the cellular market, they do not provide a solution where users require communication outside the cellular coverage area. On the other hand, satellite communication networks can provide connectivity when outside a cellular grid. Therefore, there is a need for a satellite communication system that provides cost effective service for transmitting, processing and collecting data for end users.

DETAILED DESCRIPTION

Figure 1:
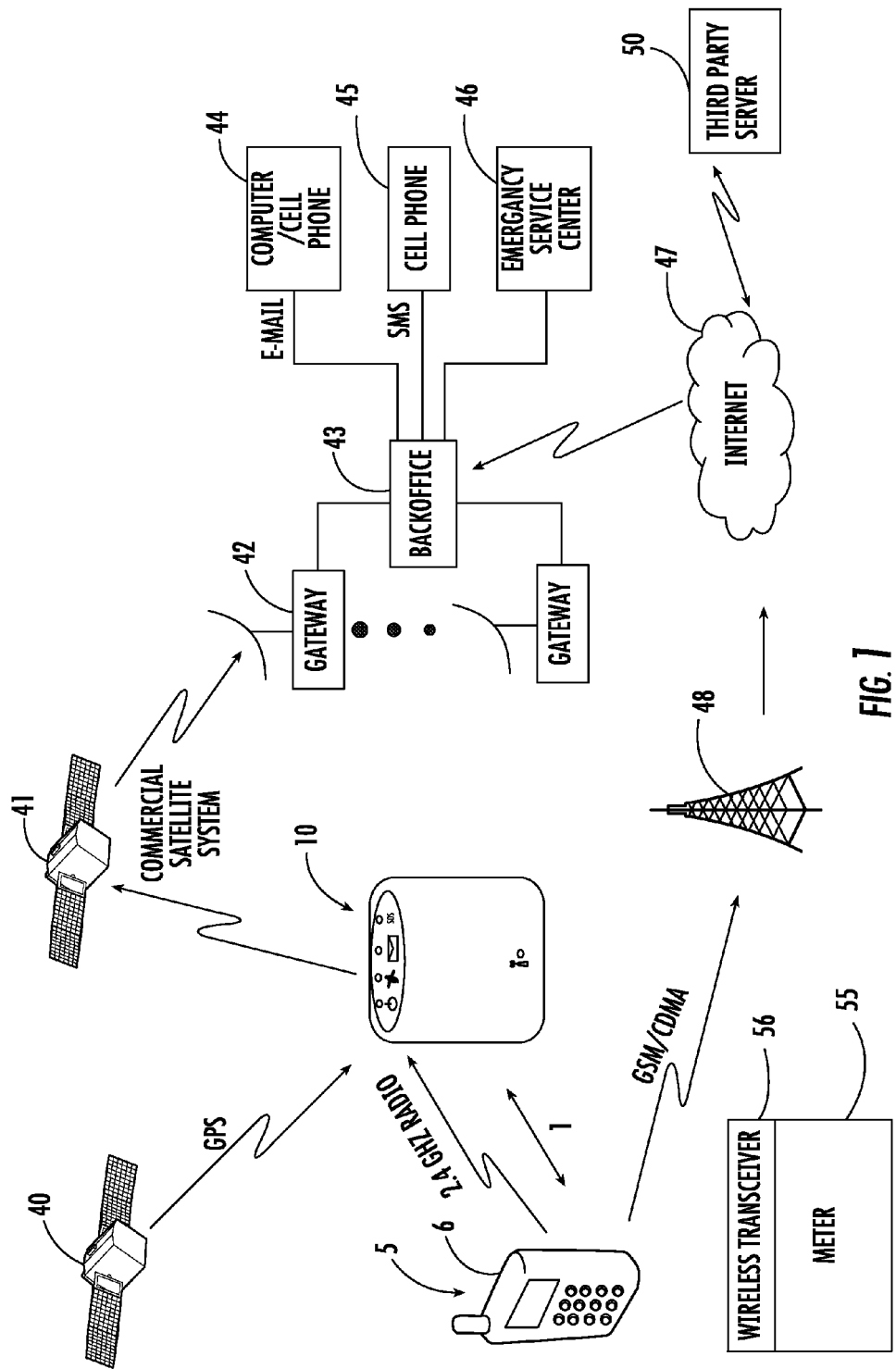
FIG. 1 illustrates a communications network utilized in one embodiment of the invention.

One embodiment of the present invention is a communications system 1 suggested by FIG. 1 and which generally includes an electronic device having graphical user interface (a "GUI device") 5 and a satellite network device (a "SN Device") 10. As suggested by FIG. 1, the GUI device 5 and SN Device 10 will typically interface with various other networks such global positioning system (GPS) satellite constellation 40, satellite communications network 41, cellular networks 48, and terrestrial gateways 42. The term "GPS" satellite network as used herein includes any global navigation satellite system, including but not limited to the US NAVSTAR system, the Russian GLONASS system the Chinese Beidou system or the European Union's Galileo system. Likewise, non-limiting examples of the satellite communications network 41 may include low earth orbiting (LEO) satellite networks, geo stationary earth orbiting (GEO) satellite networks, and other existing and future developed satellite communications networks.

Messages and data may be transmitted between satellite communications network 41 and terrestrial gateways 42 and then to a back office 43. From back office 43, the messages and data may be forwarded to various client/customer device, including the nonlimiting examples of computer/email enabled phones 44 via email, cell phones via SMS texting, or to an emergency service center via phone lines or the Internet.

Figure 2:
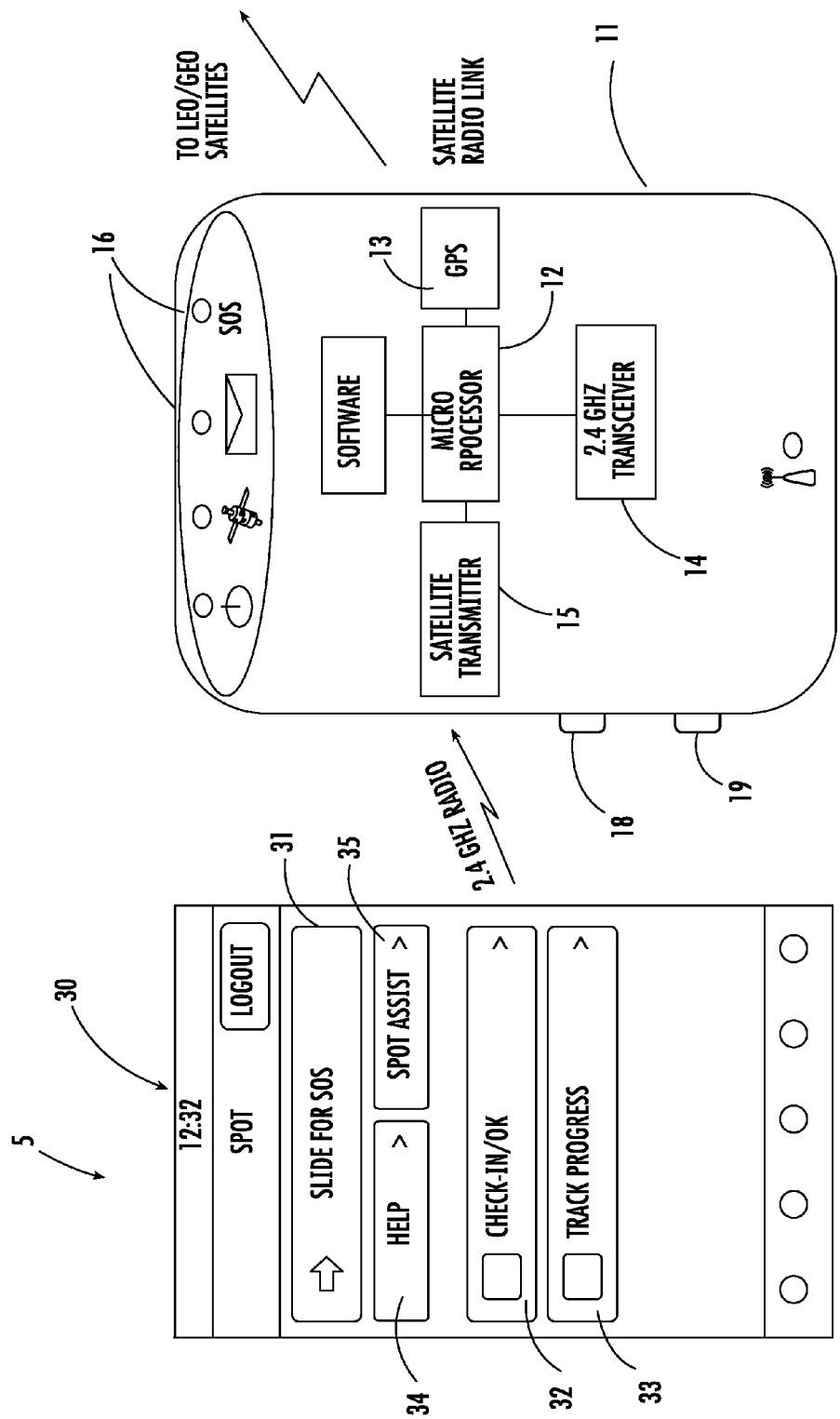
FIG. 2 illustrates the two device system forming one embodiment of the invention.

As suggested in FIG. 2, the GUI device 5 will have a user interface, typically a touch screen 30 or a passive screen with a separate keypad. GUI device 5 will also have a local wireless transceiver 7 capable of establishing a wireless link with SN Device 10. In many embodiments, GUI device 5 may be a "smart-phone" device such as an IPhone, Blackberry, or other handheld computer integrated with a mobile telephone. As non-limiting examples, the GUI Device may be any Apple OS device, including an iPhone, iPod touch, iPad 3G, or iPad Wi-Fi or any Android OS device, including a Motorola Droid, Samsung Galaxy, HTC Legend, or Nexus 2.2, any Blackberry OS device, any Windows Mobile 7 device or any desktop device such as a PC or Apple or LINUX computer. GUI device 5 may also be any other tablet computer, PDA, or any other device having a user interface, computing capabilities, and a wireless communications capability. In particular, not all GUI devices 5 need have cellular phone capabilities and may include advanced GPS devices such as the DeLorme PN-60 series, Garmin Montana series, Garmin Oregon series, or Magellan eXplorist series handheld GPS devices. In preferred embodiments, the wireless communications capability will be transceiver 7 operating in the 1 GHz to 5 GHz range, and most preferably in the range of about 2.4 GHz. However, the frequency range could be much broader, for example between about 250 MHz and about 5 GHz (including any subrange therebetween). The wireless communications can be through any conventional or future developed protocol, with non-limiting examples being wi-fi, bluetooth, zigbee, wi-MAX, or ANT. In many embodiments, the transceiver 7 will be considered a "short range" transceiver, generally not capable of reliably transmitting and receiving messages over a kilometer, or alternatively over 500 meters, or alternatively over 100 meters. Thus, wi-fi, bluetooth, zigbee, or ANT based networks are also examples of short range wireless networks. Alternatively, if the definition of "short range" is extended to under about five miles, wi-MAX based systems may also be considered short range transceivers and networks.

The SN Device 10 may likewise be a large number of different devices capable of communicating with a satellite network. Certain embodiments of SN Device 10 may provide duplex communications with the satellite network while others may provide only simplex communication. One example of SN Device 10 will be a simplex communications device similar to that described in U.S. application Ser. No. 12/215, 462, filed Jun. 27, 2008, entitled "Personal Locator and Locating Method," which is incorporated herein by reference in its entirety. As suggested in the FIG. 2 embodiment, this version of the SN Device will include the microprocessor 12, the GPS receiver 13, the simplex satellite transmitter 15, and the 2.4 GHz transceiver 14. The transceiver 14 of SN Device will be of the same (or sufficiently similar) type and specification that it may establish a wireless link with transceiver 7 of GUI Device 5. However, the transceivers 7 and 14 need not be integrated transmitting/receiving devices and could be separate transmitters and receivers. Similarly, while typical embodiments envision two-way communications between GUI Device 5 and SN Device 10, more specialized embodiment might utilize one way communication between the two devices, e.g., one-way communication from GUI Device 5 to SN Device 10.

In certain embodiments, SN Device 10 may have two external buttons 18 and 19 formed on the housing 11 of the SN Device. For example, the button 18 could be a power on/off switch and button 19 could be a particularly critical function/mode (i.e., the SOS mode described below) which it may be desirable to directly activate without the use of the GUI Device 5. Certain embodiments of SN Device 10 could also have LED indicators 16 to inform users that certain activity has taken place (e.g., the device is in SOS mode, a message has been transmitted, sufficient GPS satellites are visible to obtain a location fix, status of wireless link, or the on/off status of the device). In certain embodiments, the housing 11 is less than about 6 inches in length, less than about 4 inches in width, and less than about 2.5 inches in thickness, and most preferably, about 3 inches×2.5 inches×1 inch. Likewise preferred embodiments of SN Device 10 will have a weight of less than about 10 ounces and may or may not have an alphanumeric display.

In one basic embodiment suggested by FIG. 2, GUI Device 5 will have software providing a user with a series of modes which may be selected. The display screen of the GUI Device displays the modes and allows a user to select one or more of the modes which initiates the transmission of the command to the SN Device as explained below. In certain embodiments, the software application requires a user to perform at least two operations prior to initiating transmission of the SOS or HELP mode command. For example, FIG. 2 suggests the SOS mode 31 requires the user to first perform a slide action before the SOS icon is available for activation.

When a mode is selected on GUI Device 5, it will transmit a command to SN Device 10 via the short range wireless link which causes SN Device to operate in a corresponding mode for which it was previously programmed. Typically the modes of operation of the SN Device 10 include the SN Device transmitting to the satellite network 41 location data (for example the longitude and latitude coordinates of SN Device 10). As explained in more detail below, the location data may be generated by the SN Device's onboard GPS receiver or the location data may be received from the GUI Device 5 and forwarded to the satellite network by SN Device 10.

Figure 3:
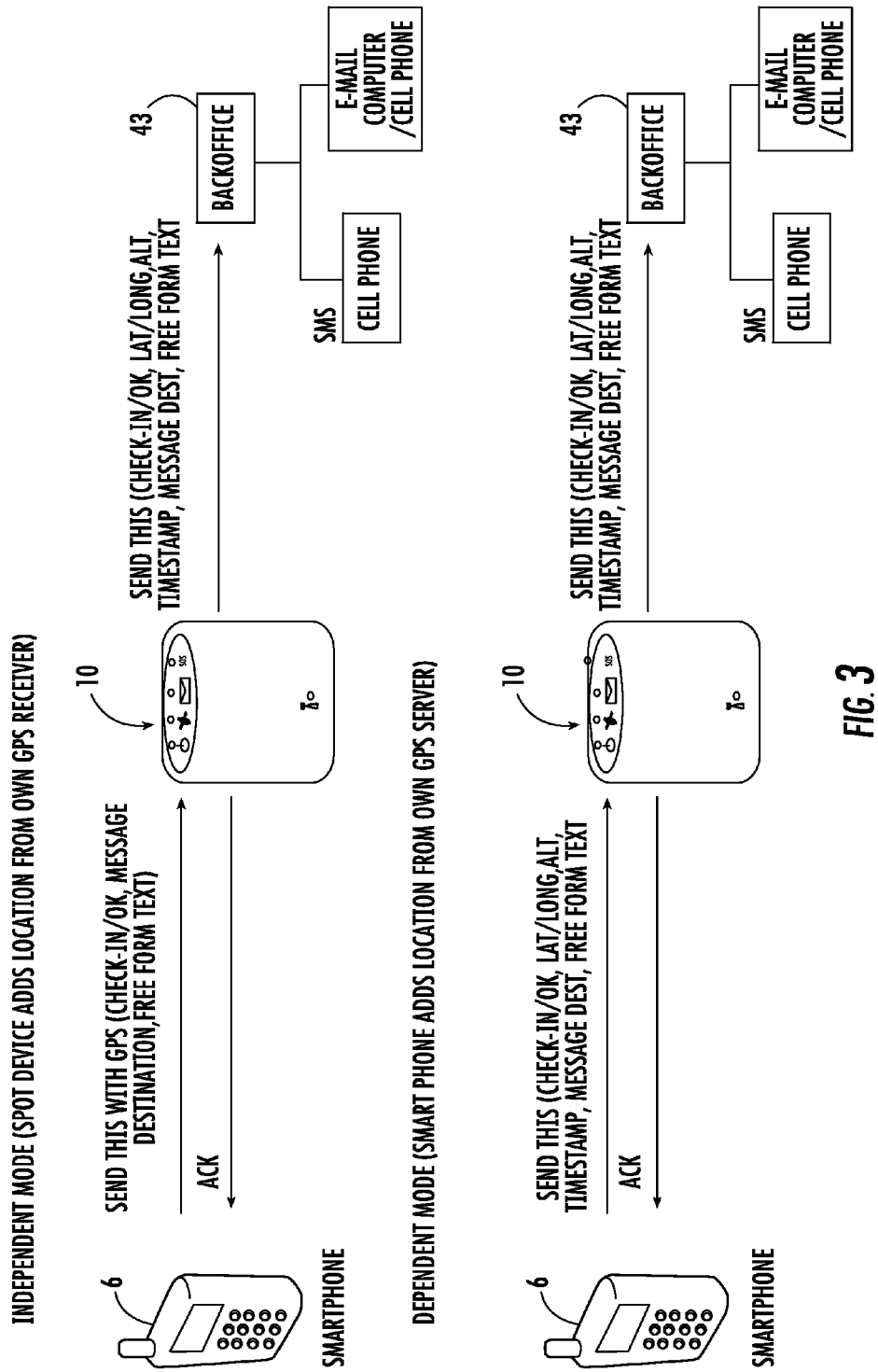
FIG. 3 schematically illustrates the transfer of selected commands/data between the devices of the system.

One typical operation sequence may be understood with reference to FIGS. 2 and 3. To initiate the process, a user turns on GUI Device 5 and the SN Device 10. The user starts on GUI Device 5 the application which will search (via wireless transceiver 7) for SN Device 10 and if a SN Device 10 is located, request whether the user wishes to connect to the SN Device 10 (or which SN Device if more than one SN Device is in range). The user may then establish a wireless link between GUI Device 5 and SN Device 10 via the blue tooth, wi-fi, other wireless protocol transceiver. The user than selects which function or mode to activate, for example, check-in/OK 32, track 33, help 34, assist 35, or SOS 31 (which are explained in more detail below).

The application then enters the selected mode and prompts the user to select one or more recipients of the location data and other data (if appropriate) and whether the user wishes to create a custom message for transmission. Once these steps are complete, the application sends the appropriate command(s) to SN Device 10 instructing SN Device 10 to enter the selected mode with the appropriate information (i.e., which recipients, what data to send). SN Device 10 acknowledges the command and starts the appropriate mode. SN device 10 transmits the appropriate information to the visible satellite(s) in communication network 41 and these satellites receive and retransmit message to the gateway 42. Gateway 42 receives the RF transmissions and decodes them into bits, and sends message/data to back office 43. Back office 43 receives the message/data and takes the appropriate action given the mode (SOS, assist, track, etc), regarding to whom to send, and what information is conveyed.

There are many variation regarding how GUI Device 5 and SN Device 10 could interact, particularly in regards to what GPS location data is used (for example, when the GUI Device also has GPS capabilities). For example, the GUI Device's software application might set as a default to use the SN Device's GPS location data and only to use the GUI Device's location data if SN Device's GPS receiver is not working or cannot other obtain location data. This may be a preferred mode because using the SN Device to determine location may be more battery efficient than having the GUI Device do so.

However, there may be situations where users desire that location data generated by the GUI Device to be utilized, for example when the SN Device is 100 feet from the GUI Device and it is the precise position of the GUI Device which is desired, or the GUI Device's GPS receiver is faster and/or more accurate than that of the SN Device. In these situations, the software application would allow the primary location data to be that generated by the GUI Device. However, there may be situations where the system nevertheless still sends location data generated by the SN Device, for example, if the current mode had not completed its function and the wireless link was lost (i.e., the GUI Device is out of range, runs out of battery or is turned off). The SN Device would complete the current mode using its own location data and then go to stand by.

Likewise, some GUI Devices may not have GPS receivers, but nevertheless be running software applications which require location data. In this situation, the GUI Device could request location data from the SN Device. The GUI Device would then be able to use applications which require location information which would not available in the absence of the SN Device. An example of this is an Ipod touch device which may run applications requiring location data, but does not have a GPS receiver or phone system. Therefore, the SN Device communicating with a non-GPS GUI Device provides the GUI Device with greater functionality.

As nonlimiting examples, the following are commands that in one embodiment could be sent from the GUI Device 5 to the SN Device 10. Each command could be a string of bytes, each with a possible value of 0-255 (outside the printable ASCII range). These example commands include: (1) Send This; (2) Send This With GPS; (3) Enter Mode; (4) Query Status; (5) Turn On GPS; (6) Query GPS (7) Turn Off GPS; and (8) Clear Buffer.

The "Send This" command could be used any time the application wishes to "drive" the SN Device with GPS data that the GUI Device is providing. The SN Device may perform some limited interpretation of the various fields of the on-air message that the application is commanding it to send, in order to determine priority levels, and to autonomously take over critical modes. The "Send This With GPS" is the same as the "Send This" command, except that the application is asking the SN Device to use its own GPS engine to populate the GPS fields of the message. For example, the command may be 8 bytes shorter than the "Send This" command since the 3 byte latitude, the 3 byte longitude, and the 2 byte altitude fields need not be sent, since the SN Device will populate those fields on its own. The other modes are largely self-explanatory. For example, the Enter Mode (plus mode type) will command the SN Device to enter a preprogrammed mode such as Help, SOS, etc. explained below. Likewise, Query Status or Query GPS commands the SN Device to report on message transmission status or whether the SN Device has obtained a GPS fix.

As suggested above, the GUI Device permits user entry of a free text message, which could be of any size allowed by system capacity, but more typically will be between 1 and 300 bytes (or any sub-range there between, e.g., 10 and 160 bytes), and then transmits the free text message to the SN Device, for example with the "Send This" command, which in turn transmits the message to the satellite network.

As nonlimiting examples, several modes will be described. Many of these modes will transmit a GPS location together with a "status message" which may simply be a predetermined byte(s) of data to indicate the level of urgency associated with the message (e.g., SOS, Help, OK/Check). It will be understood that many other modes could be employed and that the below described modes could be modified. In many embodiments, each mode may have a pre-defined message which can be sent and/or a custom message which can be sent.

Help Mode:

The SN Device will enter an autonomous Help mode. It will obtain a fix and transmit a Help message type every 5 minutes. This function is similar to that described in the above referenced U.S. Ser. No. 12/215,462. Help mode will time out after 1 hour, at which time the SN Device will return to Standby mode. This mode may be elevated to SOS mode by sending an SOS Command, or to combination Help+SOS by sending a Combination Help+SOS command. Issuing either of these command types will elevate the "Mode of Operation" of the unit from "Urgent" to "Critical". It may be terminated by sending a Cancel Help command (which will cause the SN Device to enter Cancel Help mode). While in Help mode, the SN Device will consider itself to be in "Urgent Operation" and will only respond to commands of "Urgent" level or higher. When in Help mode, the SN Device will accept "Send This" or "Send This with GPS" commands that are of type "Help" or "Combined Help+SOS". Help commands may be sent with Group ID and/or Social Destination and/or Pre-Defined Message ID fields set to non-zero (non-default) values. If these fields are set to non-default values, the message will be repeated a minimum of 3 times with the GPS data updated by the SN Device with each repeat.

SOS Mode:

The SN Device will enter an autonomous SOS mode. Any pending message from a lower-level mode will be cleared. It will obtain a fix and transmit an SOS message type every 5 minutes. This function is similar to that described in the above referenced U.S. Ser. No. 12/215,462. SOS mode will never time out and will run until the batteries die if not canceled. This mode may be modified to Combined SOS and Help mode by sending a Combination Help+SOS command. It may be terminated by sending a Cancel SOS command (which will cause the SN Device to enter Cancel SOS). While in SOS mode, the SN Device will consider itself to be in "Critical Operation" and will only respond to commands of "Critical" level. When in SOS mode, the SN Device will accept "Send This" or "Send This with GPS" commands that are of type "SOS" or "Combined Help+SOS". SOS and Combined Help+SOS commands may be sent with Group ID, Social Destination or Pre-Defined Message fields set to non-zero (non-default) values. If these fields are set to non-default values, the message will be repeated a minimum of 3 times with the GPS data updated by the SN Device with each repeat.

If the message type indicates appended free text, the SN Device will repeat the message 3 times, updating the GPS data as described above.

Track Mode:

This command will cause the SN Device to enter Autonomous Track mode. It will obtain a GPS fix and transmit it at 10 minute intervals. It will time out after 24 hours. Upon receiving any command of "Urgent" or "Critical" level, it will immediately exit track mode. While in track mode, the Application may send "Send This" or "Send This with GPS" commands of Casual level, specifically OK/Check, Point of Interest, with Group ID, Pre-Defined Message and Social Destination fields set to any valid value. The SN Device will also accept Geo Text messages of a "Casual" priority type. When such a command is received while the SN Device is in Autonomous Track mode, the SN Device will place the message in the buffer and will resume Autonomous Track mode once the buffer is empty for the duration of the 24 hours. While in Casual modes of operation, any GPS coordinates contained within OK/Check or "Point of Interest" Casual message types will not be updated upon each repeat of the message. A Point of Interest message sends a location that is user selected instead of the current location of the device allowing, for an example, to send a "meet me here" message.

Figure 4:
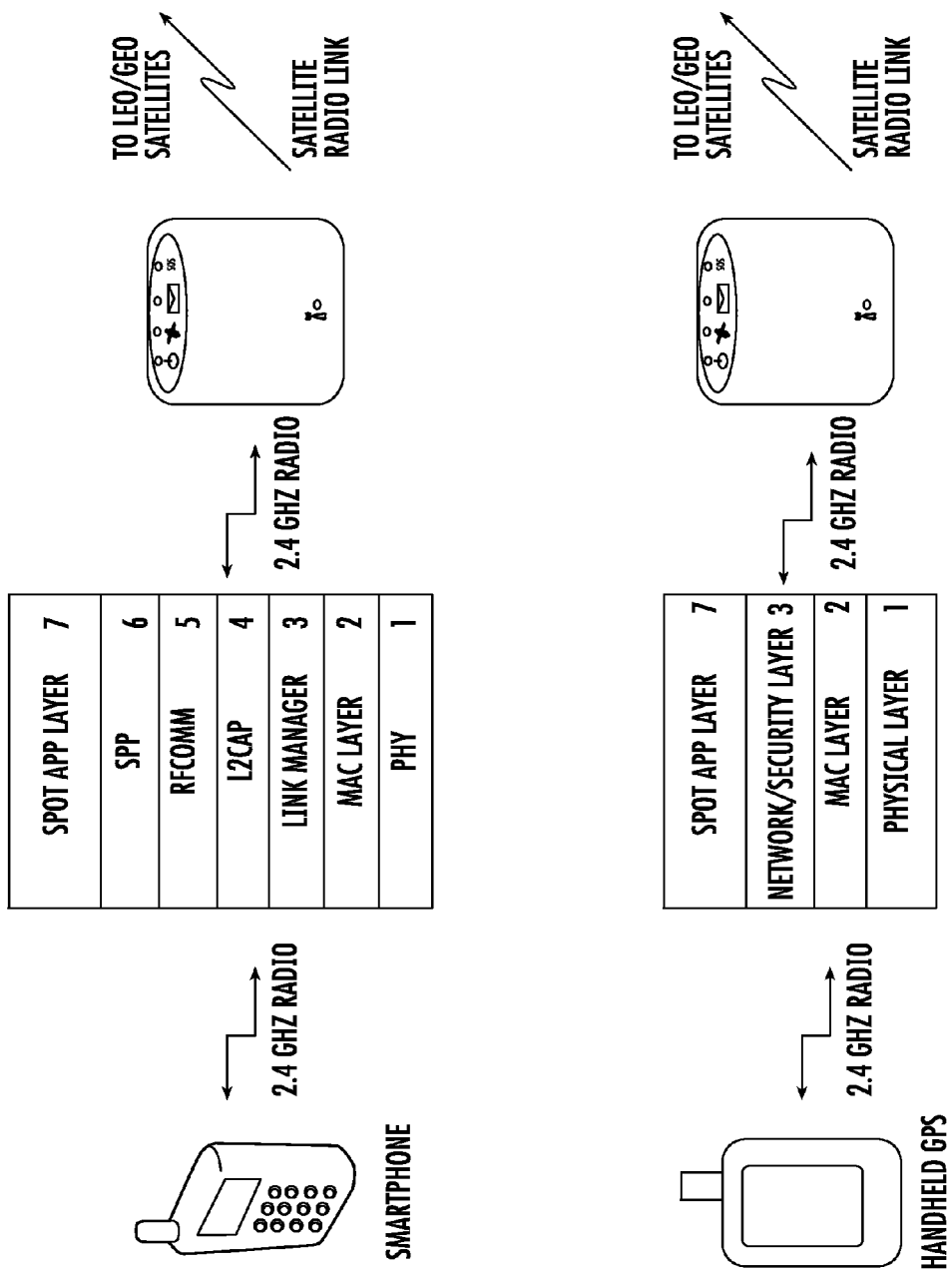
FIG. 4 schematically illustrates the organization of application layers in certain embodiments of the invention.

In certain embodiments, suggested by FIG. 4, the wireless interconnection between the SN device and GUI device is based upon a four layer (partial) or seven layer (complete) Open Standard Interface (OSI) model. Layer 1, the physical layer establishes and terminates the connection, does contention resolution and flow control, and the modulation and demodulation. Non-limiting examples of the physical layers used in this invention are WiFi, Bluetooth, WiMAX, ANT and proprietary systems such as the one used to connect to a DeLorme handheld GPS, or in Apple devices, iAP over Bluetooth and Location Lingo for location data. Layer 1 works on individual bits.

Layer 2, the data link/MAC layer, is mainly used to detect and correct errors, does framing and physical addressing. Layer 2 works on frames. Layer 3, the network/Link Manager/Security layer, does path determination and logical addresses. Layer 3 works on packets or datagrams. For some communicator protocols, such as the one used with some GPS devices, the application layer sits on top of Layer 3. For others, the complete Open Systems Interconnect (OSI) model is used.

In the case of the complete OSI model, Layer 4, the transport/layer (L2CAP), controls the end-to-end connections, reliability, and flow control. L2CAP carries PPP frames inside the transport packet. Layer 4 works on data segments. Layer 5, the session layer (RFCOMM), controls the interhost communications. Layers 5 through 7 work on the data itself. Layer 6, the presentation layer (SPP) works on data representation, encryption and dedryption, converts machine dependent data to machine independent data. Layer 7 is the application layer. In this layer, each application, such as an application directing the SN Device functions described above, defines independently from all the lower layers, what the data means.

Many alternatives and variations on the above described embodiments will be apparent to those skilled in the art. In one embodiment (Embodiment A), the communications system comprises (i) a SN Device including a satellite transmitter and a local wireless transceiver; (ii) a GUI Device, separate from the SN Device, the GUI Device including a user interface and local wireless transceiver capable of establishing a wireless link with the SN Device; where the GUI Device transmits command information to the SN Device and the SN Device transmits at least location data to a satellite network.

Variations on Embodiment A could include: (i) the SN Device including GPS receiver circuitry; (ii) the SN Device transmitting location data and a status message; (iii) the SN Device being programmed with a plurality of modes and the command from the GUI Device causes the SN Device to begin operation in one the modes; (iv) the modes including SOS, HELP, Check-In/OK, and TRACK modes; (v) command information sent by the GUI Device instructing the SN Device to send a particular status message; (vi) the GUI Device including a display screen and a software application which displays the modes and allows a user to select one or more of the modes which initiates the transmission of the command to the SN Device; (vii) a software application requiring a user to perform at least two operations prior to initiating transmission of the SOS or HELP mode command; (viii) the GUI Device permitting user entry of a free text message of between 1 and 160 bytes, and then transmits the free text message to the SN Device; (ix) the SN Device transmitting the free text message to a satellite network; (x) the satellite network being a LEO simplex satellite network; (xi) the SN Device having a housing and the housing being limited to three or fewer mechanically activated external buttons and the buttons include a power button and a button activating an SOS mode; (xii) the SN Device having a housing and the housing being less than about 6 inches in length, about 4 inches in width, and about 2.5 inches in thickness; (xiii) the SN Device having a weight of less than about 10 ounces; (xiv) the GUI Device is an Apple OS device, including an iPhone, iPod touch, iPad 3G, or iPad Wi-Fi; (xv) the GUI Device being an Android OS device, including a Motorola Droid, Samsung Galaxy, HTC Legend, or Nexus 2.2; and (xvi) the GUI Device requesting location data from the SN Device and in response, the SN Device transmitting the location data to the GUI Device over the wireless link.

Another embodiment (Embodiment B) could be a A satellite communications device comprising: (a) a satellite transmitter; (b) a GPS receiver; (c) a microprocessor; and (d) a short range wireless transceiver. Variations on Embodiment B could include: (i) the satellite transmitter being a simplex transmitter; (ii) the wireless transceiver operating in the approximately 2.4 GHz range; (iii) the wireless transceiver operating using a wi-fi, blue tooth, wi-MAX, or ANT wireless protocol; (iv) the device being programmed with a plurality of modes with each of the modes directing the device to transmit at least one location fix via the satellite transmitter; (v) the modes including SOS, HELP, CHECK-IN/OK, and TRACK modes; (vi) the device being programmed to select a mode based upon a command signal received via the wireless transceiver; (vii) the device having a housing and the housing being limited to having buttons only for power on/off and activating an SOS mode; (viii) the device having a housing and the housing being less than about 6 inches in length, about 4 inches in width, and about 2.5 inches in thickness; and (ix) the housing having no alpha-numeric display.

The communications system described herein could have the ability to send a message and/or status to a social network (such as twitter or facebook) using in-direct social network authentication (i.e., it wouldn't be necessary to login to the social network from the GUI device). In another embodiment, address book contacts in the GUI device may be imported into the SN device application for use in addressing messages generated by the system. Likewise, use information from the GUI device may be employed to augment particular mode(s) in order to send information to a particular site (i.e., performing a special "datapush" for a particular mode using the GUI device information). An example of this would be a user employing a handheld GPS device (the GUI device) for geocaching. When the geocache is found, the user marks on the GUI device that the cache has been found. This "use" would result in the GUI device sending the SN device a special Check-In/OK message which causes the back office to send a message directly to geocache.com marking that this user just found this particular cache. Another example includes playing a game application on the GUI device and sending a special Check-In/OK when a move has been made or game has been completed. In certain embodiments, when the system is in (or is moved back to) an area of cellular or wi-fi coverage, an update status (e.g., received or not received) of messages previously sent via the GUI device across a satellite network could be transmitted to the GUI device via the cellular or wi-fi networks based upon the back office confirming receipt of the message. Likewise, the SN device could be used to send a message (via the GUI device) to the back office over the cellular or wi-fi network. Furthermore, the back office system could integrate messages received via satellite, cellular and/or wifi and present an integrated list of messages to the user.

The SN device could also store multiple configurations of GUI devices which have been previously paired to the SN device so that upon another connection for a particular GUI device, the SN device knows which configuration to use Likewise, the GUI device application may store multiple user configuration files so that a single GUI device can be connected to multiple SD devices without having to re-synch each time.

In certain embodiments, the system may utilize a combination of send and store/forward in order to save bandwidth over a satellite network. For example, a reduced tracking message send rate could be used. When such a method is used, the system sends fewer track messages via satellite, but also stores a more frequent track message and then, when in cellular/wi fi coverage, the system sends the stored messages to make a more complete tracking profile for the user. Other satellite band-width saving techniques might include (i) use of pre-defined messages; and (ii) automatically creating pre-defined messages from previous customer messages.

In certain embodiments, the system application (typically on the GUI device) allows for pre-down loading (via cell or wi-fi network) of maps (e.g., road maps, top( ) maps or any GIS map) for use when device is not in cellular/wi fi coverage.

In certain embodiments, the SN device will allow sending of an SOS or other emergency message even when the user is not logged in or when the GUI device is not registered to an account holder of the service provider for the SN device.

Another embodiment is a communications system where an SN Device transmits to a satellite network's back office a message including user device identity data and third party server identity data. The back office then utilizes the user device identity data to access user authentication data stored with the back office. The back office establishes a link with the third party server (e.g., server 50 in FIG. 1) employing the user authentication data, and finally the back office transmits the message received from the SN Device to the third party server.

The "user device identity data" may be any data or identifier which identifies the SN Device, the GUI Device, or the user. Examples of user device identity data include the electronic serial number of the GUI Device, the electronic serial number of the SN Device, or a user logon ID previously established by the user. A "user logon ID" can be any identifying data which the user establishes to identify himself or herself as a registered user on a third party server (e.g., a logon ID to a social network system). The "third party server identity data" may be any data originating with a third party which the (satellite system) back office uses to identify the third party server to which the message is to be sent. As one example, the third party server identity data could be a third party application key, e.g., a security key established by the vendor of an application running on the GUI Device. The third party application key could be any form of identity code or data which a third party establishes for identifying or limiting access to users. In this embodiment, the third party application key may be included in the message sent from the from an SN Device, through the satellite network, to the back office. The back office will then use the third party application key to identify the appropriate server(s) to which the message should be forwarded.

As another example, the third party server identity data could a "system destination code." A system destination code is a character set typically shorter than the third party application key and will be associated with the third party server identity/address in the back office. In this example, the satellite system provider will create the system destination code and associate it with the third party server identity/address. This allows the smaller system destination code (equating to a smaller satellite message payload) to be transmitted over the satellite network to the back office, where the system destination code will then be matched with the third party server address allowing the message to be sent to the third party server.

In one example of this embodiment, the back office system can push the data to an enterprise server of another company or Social Network based upon the ESN of the SN device, the application that is used on the GUI device, or the message type. A simple example of this would be a large company (hypothetically "ABC Company") which has multiple divisions. ABC Energy division would want its units to send messages that are of interest to them and to the ABC Energy division's operations center as opposed to the ABC Transportation division. When the SN Devices are bought, they are given to the particular division and noted to the SN Device service provider and, then, based upon ESN, the messages get sent to the correct operations center (i.e., server) within ABC. An example of routing based upon application on the GUI is where, if using a facebook application, the messages get forwarded to facebook; similarly, if using a AAA motor club application, the message is forwarded to the AAA emergency road service.

In certain embodiments, the SN device will complete a mode independently of the GUI device (e.g., continue to send Track or HELP or SOS messages). Thus, this embodiment contemplates the GUI device initiating the mode and the S/N device continuing with no further commands from the GUI device. For GUI devices which cannot perform multi-tasking, the SN device may temporarily suspend transmission to the GUI device and then resume the wireless connection and send the data to the GUI device when the GUI returns to the application for the SN Device.

In one embodiment, for each different operating system, a software tool kit is available which allows other applications to put satellite messaging into their application. Special modes may be defined when this is done. This is a further integration where the SN application that is on the GUI device is no longer a separate application, but built into other applications. The AAA description given above is an example of this embodiment and describes two concepts: (i) SN applications may be built into another application; and (ii) a special message may be sent based upon the application being employed.

A still further embodiment is a satellite communications system having a SN Device 10 comprising a housing 11 which includes a satellite transmitter 15, a microprocessor 12, and a short range wireless transceiver 14. The system further includes a utility meter having a wireless transmitter 56 on a meter 55 which transmitts a utility meter value and the SN Device 10 wirelessly receives the utility meter value and transmits the utility meter value via the satellite network 41 to a satellite back-office 43 which then transmits the utility meter value to a server of an utility operator 50.

Although the above specification describes the invention in terms of certain specific embodiments, these embodiments are illustrative examples only and those skilled in the art will recognize many further obvious variations and modifications. All such variations and modifications are intended to come within the scope of the following claims.

The invention claimed is:

1. A communications system comprising:
   a. a SN Device including a satellite transmitter, GPS receiver circuitry, and a short range non cellular wireless transceiver;
   b. a GUI Device, separate from the SN Device, the GUI Device including a user interface and short range non-cellular wireless transceiver capable of establishing a wireless communications link with the SN Device;
   c. wherein the GUI Device is configured to transmit command information to the SN Device through the wireless transceiver and the SN Device is configured, upon receipt of command information from the GUI Device, to transmit at least user device identity data through the satellite transmitter; and
   d. wherein the SN Device and the GUI Device each have a housing and there is no physical connection between the housings.

2. The communications system according to claim 1, wherein the SN Device satellite transmitter is a simplex or a duplex transmitter.

3. The communications system according to claim 1, wherein the wireless communications link is in the approximately 250 MHz to approximately 5 GHz range.

4. The communications system according to claim 3, wherein the wireless communications link is in the approximately 2.4 GHz range.

5. The communications system according to claim 1, wherein the wireless communications link comprises a wi-fi, blue tooth, wi-MAX, or ANT wireless protocol.

6. The communications system according to claim 1, wherein the SN Device is further configured to transmit location data through the satellite transmitter.

7. The communications system according to claim 6, wherein the location data is derived either by the GUI Device and transmitted to the SN Device over the wireless communications link or derived by the SN Device.

8. The communications system according to claim 7 wherein the SN Device transmits location received from the GUI Device in preference to location data generated by the SN Device.

9. The communications system according to claim 6, wherein the SN Device is configured with a plurality of modes and the command information from the GUI Device includes a mode selection.

10. The communications system according to claim 1, wherein the SN Device is further configured to transmit location data and status message data through the satellite transmitter.

11. The communications system according to claim 1, wherein the GUI Device is further configured to transmit over the wireless communications link to the SN Device of a user entered free text message of between 1 and 160 bytes, and the SN Device configured to receive the transmitted free text message and then transmit the free text message through the satellite transceiver.

12. The communications system according to claim 1, wherein the SN Device housing has no alpha-numeric display window.

13. The satellite communications device according to claim 1 wherein the GUI Device is configured to derive location data and transmit the GUI Device derived location data to the SN Device over the wireless communications link.

14. The satellite communications system according to claim 1, wherein the GUI device includes an accelerometer and upon detection of an acceleration and/or deceleration event of predetermined magnitude, the GUI Device is configured to transmit a data message to the SN Device over the wireless communications link instructing the SN Device to transmit an emergency message through the satellite transmitter.

15. The communications system according to claim 1 further comprising a remote back office in communication with a communications network, said back office comprising a data storage and a processor configured to be capable of receiving data transmitted by said SN Device through the satellite transceiver, wherein
   i) the SN Device is configured to transmit third party server identity data through the satellite transceiver,
   ii) the back office, upon receipt of the user device identity data and third party server identity data from the SN Device, configured to access user authentication data stored on the database;
   iii) the back office configured to transmit over the communications network a message and access user authentication data to a third party server associated with the third party server identity data.

16. The communications system according to claim 15, wherein the user device identity data and third party server identity data are transmitted from the GUI Device to the SN Device.

17. The communications system according to claim 15, wherein the user device identity data is one or more of an electronic serial number of the GUI Device, an electronic serial number of the SN Device, or a user logon ID previously established by a user.

18. The communications system according to claim 15, wherein the third party server identity data is a third party application key or a system destination code.

19. The communications system according to claim 1, wherein the GUI Device includes at least one of a cellular transceiver or a short range transceiver.

20. The communications system according to claim 19, wherein the GUI Device or the SN Device record a series of location fixes and is configured to transmit only a portion of the recorded location fixes over the satellite transceiver.

21. The communications system according to claim 20, wherein the GUI Device is a cellular enabled device and the GUI Device is configured to transmit substantially all location fixes over a cellular network when the GUI Device is within the range of a cellular or a short range network.

22. The communications system according to claim 1, wherein the GUI Device is configured to receive a utility meter value, and transmit the utility meter value over the wireless communications link to the SN Device.

23. The communications system according to claim 22, wherein said utility meter value is received wirelessly by the GUI Device.

24. The communications system according to claim 23, wherein the GUI Device is further configured to receive a customer or meter identification wirelessly from a utility meter, wherein the customer or meter identification is transmitted over the wireless communications link to the SN Device.

* * * * *